United States Patent
High et al.

(10) Patent No.: US 10,026,315 B2
(45) Date of Patent: Jul. 17, 2018

(54) APPARATUS AND METHOD FOR MONITORING PARKING AREA

(71) Applicant: Wal-Mart Stores, Inc., Bentonville, AR (US)

(72) Inventors: Donald R. High, Noel, MO (US); Chandrashekar Natarajan, San Ramon, CA (US); Michael D. Atchley, Springdale, AR (US); John P. Thompson, Bentonville, AR (US); Brian G. McHale, Chadderton Oldham (GB)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 15/340,860

(22) Filed: Nov. 1, 2016

(65) Prior Publication Data
US 2017/0124378 A1 May 4, 2017

Related U.S. Application Data

(60) Provisional application No. 62/249,635, filed on Nov. 2, 2015.

(51) Int. Cl.
*G08G 1/14* (2006.01)
*G06K 9/00* (2006.01)
(Continued)

(52) U.S. Cl.
CPC ........... *G08G 1/14* (2013.01); *G06K 9/00637* (2013.01); *G06K 9/00771* (2013.01);
(Continued)

(58) Field of Classification Search
CPC .......... G08G 1/14; G08G 1/146; G08G 1/147; G08G 1/148; G06K 9/008; G06K 9/006;
(Continued)

(56) References Cited

U.S. PATENT DOCUMENTS

| | | | |
|---|---|---|---|
| 6,559,776 | B2 | 5/2003 | Katz |
| 8,768,867 | B1 | 7/2014 | Thaeler |

(Continued)

FOREIGN PATENT DOCUMENTS

CN 102436756 5/2012

OTHER PUBLICATIONS

CNBC; "Parking lot pix and more . . . from satellites", http://video.cnbc.com/gallery/?video=3000362172, Mar. 16, 2015, pp. 1-5.

(Continued)

*Primary Examiner* — Benyam Haile
(74) *Attorney, Agent, or Firm* — Fitch, Even, Tabin & Flannery LLP (57) ABSTRACT

Systems, apparatuses and methods are provided herein for monitoring a parking area. A system for monitoring a parking area comprises a satellite image database storing a plurality of satellite images of a parking lot taken by one or more satellites over time, a baseline database storing baseline models of a plurality of sections of the parking lot, and a control circuit coupled to the satellite image database and the baseline database. The control circuit being configured to: determine a utilization condition for each of the plurality of sections of the parking lot based on performing image analysis on the plurality of satellite images of the parking lot, compare the utilization condition for each of the plurality of sections of the parking lot with the baseline model of the plurality of sections of the parking lot, and in an event that the utilization condition of a section of the plurality of sections of the parking lot substantially deviates from the baseline model of the section, automatically generate an action recommendation for the section of the parking lot.

23 Claims, 3 Drawing Sheets

(51) Int. Cl.
*G06Q 50/00* (2012.01)
*G06K 9/36* (2006.01)

(52) U.S. Cl.
CPC ............ *G06Q 50/00* (2013.01); *G08G 1/145* (2013.01); *G06K 9/36* (2013.01); *G08G 1/146* (2013.01); *G08G 1/147* (2013.01); *G08G 1/148* (2013.01)

(58) Field of Classification Search
CPC ............ G06K 9/007; G06K 9/36; G06K 9/46; G06K 10/06
See application file for complete search history.

(56) References Cited

U.S. PATENT DOCUMENTS

| | | |
|---|---|---|
| 2005/0280555 A1 | 12/2005 | Warner |
| 2012/0106800 A1* | 5/2012 | Khan ................ G06K 9/00651 382/104 |
| 2014/0266801 A1 | 9/2014 | Uppal |
| 2015/0009047 A1 | 1/2015 | Ashkenazi |
| 2015/0078624 A1 | 3/2015 | Fukuda |
| 2016/0171278 A1* | 6/2016 | Ponder ............... G06K 9/00651 382/104 |
| 2016/0171891 A1* | 6/2016 | Banatwala ............. G07B 15/02 340/932.2 |

OTHER PUBLICATIONS

Hope, Bradley; "Startups mine data from parking lots, shadows", MarketWatch, http://www.marketwatch.com/story/startups-mine-data-from-parking-lots-shadows-2014-11-20/print, Nov. 20, 2014, pp. 1-3.

Knapp, Alex; "Orbital Insight Raised $8.7 Million to Use AI to Analyze Satellite Data", Forbes, http://www.forbes.com/sites/alexknapp/2015/03/20/orbital-insight-raised-8-7-million-to-use-ai-to-analyze-satellite-data/#7fcfdfed2aa5, Mar. 20, 2015, pp. 1-3.

* cited by examiner

APPARATUS AND METHOD FOR MONITORING PARKING AREA

CROSS-REFERENCE TO RELATED APPLICATION

This application claims the benefit of U.S. Provisional Application No. 62/249,635, filed Nov. 2, 2015, which is incorporated herein by reference in its entirety.

TECHNICAL FIELD

This invention relates generally to parking area management.

BACKGROUND

Retail stores and centers often include a parking area. A customer's experience with the parking area can affect the customer's overall shopping experience.

BRIEF DESCRIPTION OF THE DRAWINGS

Disclosed herein are embodiments of apparatuses and methods for monitoring a parking area. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for monitoring a parking area. A system for monitoring a parking area comprises a satellite image database storing a plurality of satellite images of a parking lot taken by one or more satellites over time, a baseline database storing baseline models of a plurality of sections of the parking lot, and a control circuit coupled to the satellite image database and the baseline database. The control circuit being configured to: determine a utilization condition for each of the plurality of sections of the parking lot based on performing image analysis on the plurality of satellite images of the parking lot, compare the utilization condition for each of the plurality of sections of the parking lot with the baseline model of the plurality of sections of the parking lot, and in an event that the utilization condition of a section of the plurality of sections of the parking lot substantially deviates from the baseline model of the section, automatically generate an action recommendation for the section of the parking lot.

In some embodiments, parking lot satellite image analysis may be used by a store to evaluate the sufficiency of parking lot capacity, compare nearby stores, detect constantly filled spots, detect lot damage, determine traffic flow, determine delivery area efficiency, and/or detect parking abuses from RVs, trucks, or non-customers. The system may translate multiple satellite images into data and compare the data with other statistical information such as sales, visits, costs, shipping, receiving, and labor associated with the stores.

Generally, the satellite images provides a "bird's eye view" of shopping facilities being managed. The system may direct a satellite to capture images at selected locations. Images may be taken at a set frequency with time limitations (e.g. day, night, peak hours) over a period of time (days, weeks, months, years) and stored in a computer readable storage medium. Image analysis may be performed on the satellite images to determine information such as 1) the number of cars in the lot, 2) the number of open parking spaces, 3) the location of each open and taken parking space, 4) the number of spaces taken by cars versus other types of vehicles, 5) the number of spaces taken by non-vehicles (snow, products from lawn and garden, other items), 6) the number of spaces taken by cart corrals, 7) the number of spaces where shopping carts are present, 8) the number of trailers in the parking area, 9) which parking spaces are premium spaces (spots that are most frequently filled), 10) the occupancy rate at each time slot, 11) the best time periods for expedient shopping per demographic category specified (retirement area, soccer mom, collage town), and 12) the occupancy rate of the handicap spaces. The system may also store other known information about the parking area such as 1) the location of each space recorded, 2) the number of spaces the parking lot currently has, 3) the number of entrances into the parking lot, and 4) the number of handicap spaces for analysis.

In some embodiments, when the system determines that parking is consistently over threshold capacity (e.g. 80%) during peak shopping hours, the system may indicate that the facility has reach a limitation which needs correction. The system may automatically and periodically recommend the expansion of the parking lot via a report to the store managers and/or supervisors. In some embodiments, the system may track the utilization rate of handicap spaces and compare it to government requirements to ensure regulation compliance. The system may recommend increasing or decreasing handicap spaces based on the comparison.

In some embodiments, the system may determine time periods with low parking area utilization rates and automatically recommend promotions to encourage customers to shop during non-peak timeframes. The parking area utilization rate may be determined for different shopper demographics, and the promotions may be targeted toward select demographic groups. In some embodiments, timeframes with low parking area utilization may be communicated to customers via email, text, website, and/or a mobile application ("app") as recommended times to visit the store. In some embodiments, a customer may sign up for a store mobile app and receive notifications of recommended times to visit the store. In some embodiments, added shopping incentives such as discounts and coupons may be made available during the recommended times.

In some embodiments, the system may identify drastic differences between stores and/or between time periods that need further investigation. For example, the system may compare the average number of cars in the parking area with the volume of sales for different stores. A store with high sales volume but few cars in the lot may indicate that the store has an efficient checkout process while the converse may mean that the store needs evaluation to determine the cause for the relatively high parking area utilization rate. A store with high sales and few cars in the lot may be further evaluated to see if the parking area's low utilization rate is managed by moving customers quickly in and out of the store with faster checkout lines. In some embodiments, the turnover rate for each car may be calculated to determine visit durations for customers. A store with relatively low sales and high number of cars in the lot may also be investigated for areas of improvement to reduce the visit durations for customers. Practices may be identified from stores with relative high sales and few cars in the lot and implemented in less efficient stores to increase customer flow rate.

In some embodiments, the system may identify peak and low shopping times based on analyzing parking lot utilization rate. Peak times may corresponds to a time period in a day (e.g. hours) and/or a day of the week, etc. Abnormally high customer volumes may also be identified and investigated with other data for the area such as weather and/or local events.

In some embodiments, the system may be configured to recommend one or more of the following corrective actions: provide customer incentives to shop during non-peak times, increase worker numbers, and identify underutilized parking area sections. In some embodiments, a threshold may be set and a corrective action report may be sent to the store manager and leadership with the following recommendations depending on the image analysis: contact a towing service when the number of cars exceeding a permitted parking time limit reaches a threshold, clean up carts when unreturned carts in the parking lot have exceeded a threshold, instruct associates to move their cars off prime spots when spots designated for associate parking is not utilized but other parking spots are constantly used beyond a threshold, and adjust cart corral placing to free up premium spaces and/or to better cover the most utilized parking areas.

In some embodiments, the system may detect parking lot damage based on detecting customer's avoidance of those areas. The detected damaged area may be automatically reported to store manager and leadership to remedy. Image analysis may further identify areas where directions not clearly marked and/or heavy traffic areas around receiving, drive thru, and pick up areas. The system may be further be configured to perform capacity comparison with nearby stores and traffic flow of the store area. The system may use image analysis to identify gridlock or accidents by detecting backup of traffic trying to exit the area and alert management and leadership that the store may need to adjust traffic lights, entrances, etc.

In some embodiments, the system may monitor delivery, receiving, truck and trailer traffic and parking. The number of trailers and the length of time each trailer is parked in the same position may be tracked with satellite images. The system may automatically generate a report and recommend a corrective action if a threshold is exceeded. For example, the system may monitor the duration each trailer is parked on the lot, actively unloading, waiting to unload, and waiting to be picked up.

In some embodiments, the system may be configured to monitor and manage grocery pick up traffic. The parking area may designate special spots for customers utilizing a grocery pick up program. The system may compare the actual utilization conditions of the grocery pick up areas to an expected use and capacity, and determine if additional spaces are needed or if spaces should be repurposed for regular parking. The system may also determine that the grocery pick up program has a low participation rate and may need more marketing. The effectiveness of the grocery pickup program may be monitored based on occupancy rate of the designated spaces at peak times and/or the waiting time of cars parked in the designated spaces.

Generally, the system provides a combination of automation in the retrieval and analysis of information. The system may utilize parking lot satellite images to understand shopping facility usage and convert the images to parking data to automatically recommend corrective actions to store management and leadership. The system may further allow the stores to track the utilization conditions and recommendations over time to understand the effectiveness of the recommendations and corrective actions.

Figure 1:
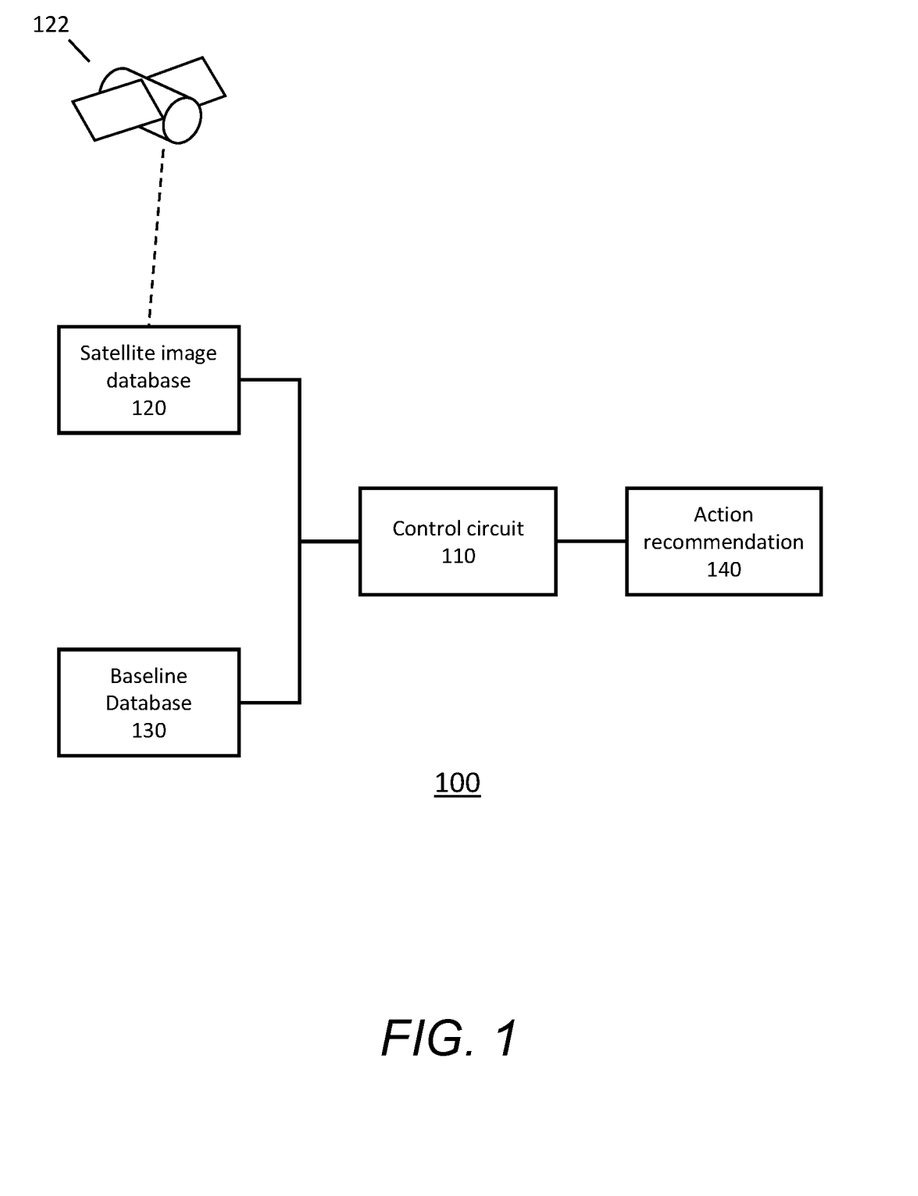
FIG. 1 is a block diagram of a system in accordance with several embodiments.

Referring now to FIG. 1, a system for monitoring a parking area is shown. The system 100 includes a control circuit 110 coupled to a satellite image database 120 storing images captured by a satellite 122 and a baseline database 130. The control circuit 110 is configured to determine and generate action recommendation 140.

The control circuit 110 may comprise a central processing unit, a processor, a microprocessor and the like and may be part of a server, a central computing system, a cloud server, and the like. The control circuit 110 may be configured to execute computer readable instructions stored on a computer readable storage memory (not shown). The computer readable storage memory may comprise volatile and/or non-volatile memory and has stored upon it a set of computer readable instructions which, when executed by the control circuit 110, causes the system to output action recommendation 140 based at least on the information in the satellite image database 120 and the baseline database 130. Generally, the computer readable instructions may cause the control circuit 110 to perform one or more steps in the methods and processes described with reference to FIG. 2 herein.

The satellite image database 120 comprises computer readable memory and has stored upon it multiple satellite images of one or more parking areas captured by one or more satellites 122. The satellite 122 may be operated or leased by a retail entity and be directed to periodically capture images of one or more parking areas. The images may be received via a satellite receiver and may be forwarded to the retail entity from a satellite operator service. In some embodiments, the satellite 122 may represent a system of multiple satellites orbiting the earth. The parking area and parking lot may generally refer to the open air area of a shopping facility and may include one or more of parking spots, roadways, pedestrian walkways, medians, landscaping areas, truck loading and unloading areas, cart return areas, passenger loading areas, etc.

The baseline database 130 comprises computer readable memory and has stored upon it one or more baseline models for one or more parking areas. A baseline model for a parking area may comprise one or more of: overall utilization rate, utilization rate by timeframe (hour, day, week, month, etc.), overall vehicle turnover rate, vehicle turnover rate by timeframe, vehicle types, roadway flow rates, etc. These values may be specified for different sections of a parking area. For example, a utilization condition model may specify different values or value ranges for all parking spots, a subset of parking spots, individual parking spots, specialized parking spots (e.g. handicap spots, trailer spots, RV spots, etc.), pathways, roadways, truck loading zone, etc. In some embodiments, the baseline models may be based on historical values of the specific store or of a collection of stores, and/or may comprise values corresponding to an optimum condition. For example, the baseline model may be based on the store's average utilization condition and/or the average utilization condition of similar store such that significant deviation from the average utilization condition may be detected by the system. In some embodiments, the baseline model may be automatically updated based on an average utilization condition from the specific store and/or a collection of stores derived from on-going image analysis of satellite photos. In some embodiments, the baseline model may further specify a deviation threshold that is used to determine whether the deviation is sufficiently significant to generate an action recommendation. In some embodiments, different action recommendations may be generated based on the amount of deviation from the baseline model.

In some embodiments, the baseline database 130 and/or a separate storage device may store other analytics information accessible by the control circuit 110. For example, parking lot layout, parking space assignment, sales data for one or more stores, promotions at one or more stores, demographic information associated with each vehicle type, local traffic information, local weather information, holidays, etc. may also be used by the control circuit 110 for determining and generating action recommendation 140.

Action recommendation 140 may comprise one or more of a user interface display, an email, a printed report, a spreadsheet, a pop-up alert, and the like. In some embodiments, the action recommendation 140 may be included in a periodical report of a retail store. In some embodiments, the action recommendation 140 may be a pop-up notification and/or displayed information on a user interface program such as a store management program, a point of sales system, and a customer mobile application. In some embodiments, the action recommendation may be communicated via a network, such as the internet, to one or more of a store management program, a point of sales system, and a customer mobile application. In some embodiments, action recommendations 140 may further be stored in a computer readable medium for further analysis. For example, the stored action recommendations 140 may be used to update the baseline models, action recommendation triggering thresholds, and/or the algorithm with which the control circuit 110 determines an action recommendation 140.

In some embodiments, one or more of the satellite image database 120, the baseline database 130, the memory device coupled to the control circuit 110, and the memory device for storing the action recommendation 140 may be implemented on the same one or more memory devices or implemented on two or more separate devices. The satellite image database 120, the baseline database 130, the memory device coupled to the control circuit 110, and the memory device for storing the action recommendation 140 may comprise local, remote, networked, and/or cloud based storage accessible by the control circuit 110.

Figure 2:
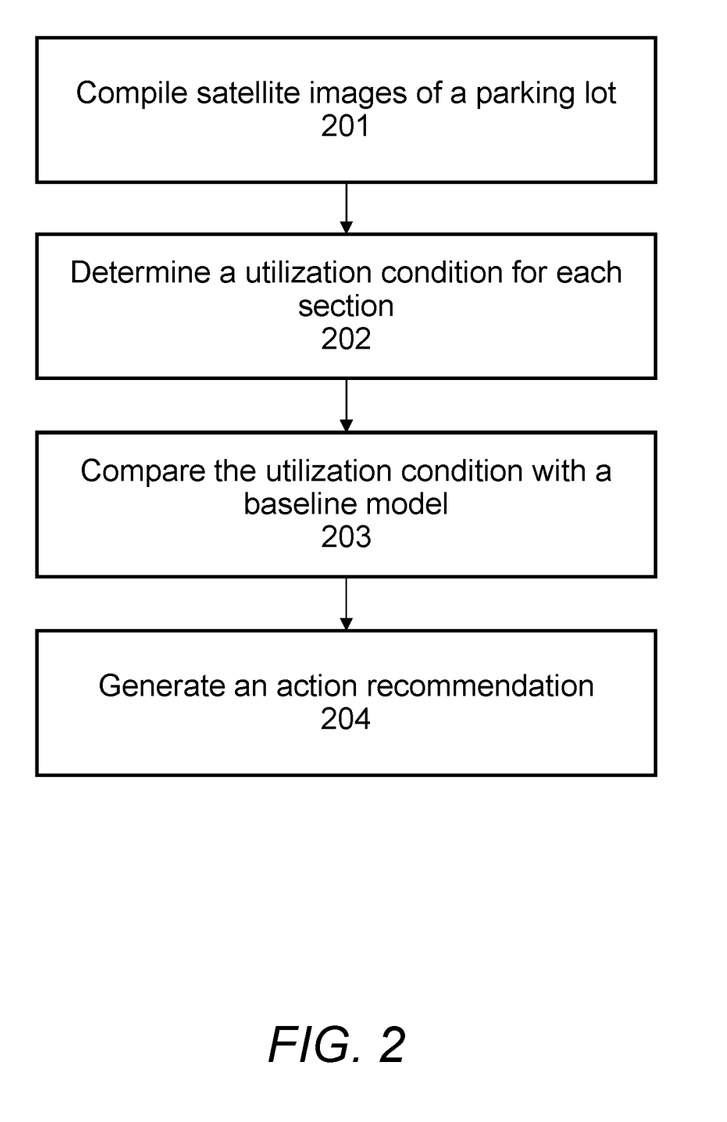
FIG. 2 is a flow diagram of a method in accordance with several embodiments.

Referring now to FIG. 2, a method of monitoring parking area is shown. In some embodiments, the steps shown in FIG. 2 may be performed by a processor-based device, such as the control circuit 110, executing a set of computer readable instructions.

In step 201, the system compiles multiple satellite images of a parking lot taken over time by one or more satellites. The satellite images may be provided by a satellite service provider and stored in a satellite image database 120. The satellite images may be captured by the same satellite or by different satellites orbiting the earth. In some embodiments, the satellite images may comprise images captured by different types of optical sensors, such as visible spectrum optical sensors and infrared optical sensor. In some embodiments, the satellite images may generally be taken from the bird's-eye view of the parking lot. The images may be compiled by isolating the images of the parking lot from the captured images, matching corresponding sections of parking areas to each other, and/or sorting images based on their capture time. In some embodiments, the images taken over time may be stitched into a time lapse video of the parking lot.

In step 202, the system determines a utilization condition for a plurality of sections of the parking lot. In some embodiments, the parking lot may be divided into a plurality of sections, such as: parking spots, a subset of parking spots, individual parking spots, specialized parking spots (e.g. handicap spots, trailer spots, RV spots, etc.), pathways, roadways, truck loading zone, etc. The utilization condition may comprises one or more of: overall utilization rate, utilization rate by timeframe (hour, day, week, month, etc.), overall vehicle turnover rate, vehicle turnover rate by timeframe, vehicle type, pathway flow rate, etc. An example of the section analysis is described with reference to FIG. 3 herein.

In some embodiments, the system may count the number of parked cars and/or empty parking spots in each satellite image of the parking lot to determine the parking spot utilization rate (e.g. occupancy rate) during different times of a day, different days of a week, different days of a month, different days of a year, different weeks of a year, etc. In some embodiments, the system may count the number of parked cars and/or empty parking spots in separate sections of the parking lot and/or individual parking spots to determine the utilization rate of each of the section and/or spots over time. In some embodiments, the system may further distinguish parking spots occupied by a parked car versus other types of items (e.g. cart carol, snow, store display, etc.) and determine the utilization rate based on the actual available parking spots.

In some embodiments, the system may determine characteristics of individual cars in the parking lot based on the satellite images. In some embodiments, the system may keep track of cars parked in the same spot by their visual characteristics (e.g. color, shape, size, visible markings, etc.). The system may then determine the turnover rate (i.e. how long each car is parked) for the parking lot, a subsection of the parking, and/or each individual parking spot. In some embodiments, the system may identify each vehicle as being one or more of a sedan, a SUV, a mini-van, a pickup truck, a RV, a truck and trailer, etc. In some embodiments, the system may further visually identify other features in the parking lot such as cart return corral, charging stations, temporary tents and displays, etc. based on their respective visual characteristics. In some embodiments, the system may also visually identify obstacles in the parking lot such as damaged pavement, abandoned carts, snow, large trash, etc.

In some embodiments, the system may determine flow information for pathways and roadways in and around the parking lot. For example, the system may measure how fast it takes for each car and/or pedestrian to travel through a segment of a pathway or roadway by tracking a car and/or a pedestrian over a plurality of satellite images. The flow rate may be measured for roadways between parking spots, connecting parking spots, which can be in front of the store, leading to the exit of the store, etc. as well as public roadways around the store. The system may identify one or more of a damaged pavement condition, a narrow aisle condition, a congestion prone section, an accident prone section, and a heavy pedestrian traffic section in the parking lot based on the flow rate of various section of the parking lot.

In step 203, the system compares the utilization condition determined in step 202 with corresponding values in a baseline model for the monitored parking lot. A baseline model may comprise one or more of: an overall utilization rate, a utilization rate by timeframe (hour, day, week, month, etc.), an overall vehicle turnover rate, a vehicle turnover rate by timeframe, a vehicle type, a pathway flow rate, etc. The baseline model may comprise expected utilization conditions for different sections of a parking area and/or for different timeframes. For example, utilization conditions in the baseline model may specify different values for parking spots, a subset of parking spots, individual parking spots, specialized parking spots (e.g. handicap spots, trailer spots, RV spots, etc.), pathways, exit roadways, truck loading zones, etc. In some embodiments, the baseline models may be based on historical values of the specific store, of a collection of stores, and/or may be comprised of values corresponding to an optimum and/or ideal condition. In some embodiments, the baseline model may be automatically updated based on average values derived from satellite images of the specific store and/or a collection of stores. In some embodiments, the comparison in step 203 may further include other store related data such as store sales volume, store size, store shopper demographic, weather conditions, store staffing information, etc.

In step 204, the system generates an action recommendation based on the comparison in step 203. In some embodiments, an action recommendation may only be generated if the utilization condition determined in step 202 deviates significantly (e.g. exceeds a threshold) from the baseline model. The action recommendation may be based on the type of utilization condition determined in step 202 that is out of tolerance from the baseline model. In some embodiments, the system determines an action recommendation based on the amount of deviation detected. In some embodiments, the action recommendation may be automatically generated by selecting from a list of possible action recommendations based on the comparison.

In some embodiments, the system may compare the utilization rate (e.g. percentage of filled parking spots) in the satellite images with the expected utilization rate in the baseline model in step 203. If the utilization rate exceeds a threshold maximum utilization rate (e.g. 80%, 90%, etc.) anytime and/or during a timeframe (e.g. peak shopping time) specified in the baseline model, the system may recommend increasing the number of available parking spaces. In some embodiments, the utilization rate may further take into account obstructed spots due to abandoned carts, snow, temporary installations, construction, road damage, large trash, etc. For example, the utilization rate may be based on all spots in the parking lot and/or be based on actual available parking spots as identified in the satellite images. In some embodiments, the system may further determine one or more methods for increasing parking spots based on the analysis of parking lot images and/or other information from other stores. For example, the system may recommend reducing and/or relocation features such as cart corrals and temporary tents, reducing the number of specialized parking slots, expanding into a surrounding landscaped areas, etc. In some embodiments, the utilization rate of specialized spots may be separately tracked to determine the efficiency of the specialized spots. The specialized spots may include one or more of handicapped spots, internet order pick-up spots, expecting mothers' parking, clean air vehicles parking, charging station spots, etc. If the utilization rate of these specialized spots exceeds a threshold for a prolonged period and/or during peak hours, the system may recommend assigning additional spots as specialized spots. For handicap spots, the system may further compare the utilization condition with applicable government requirements to ensure that the requirements are met. For example, the system may determine whether the handicap parking spots are sufficient based on one or more of the store's size, the parking lot's size, the number of total available spots, the store's customer volume, etc. In some embodiments, the action recommendation may be generated based on the duration and/or frequency of high utilization rate conditions. For example, an action recommendation may only be generated if the utilization rate exceeds 80% of the lot capacity for 20% of the time that the store is in operation.

If the utilization rate of a timeframe is consistently below the expected and/or average utilization rate specified in the baseline model, the system may recommend promotions to store management and/or customers to encourage an increase of customer volume during slow periods. In some embodiments, the system may automatically send out alerts and/or time restricted promotions to encourage customers to visit the store during slow periods. For example, if the system detects that the utilization rate is particularly low between 8 am to 11 am on weekdays, the store may publish promotions (e.g. special markdowns, discounts) that only run between 8 am to 11 am on weekdays. In some embodiments, the low utilization periods and/or associated discounts may be communicated to customers via website, emails, text message, mobile application, etc. With time restricted promotions, a customer may be rewarded with discounts when they shop during a low utilization period. In some embodiments, the customer may download a mobile app and/or access a website to view the estimated parking lot occupancy rate to decide when they would like to visit a store. Generally, the utilization rate may be used to identify peak and low shopping timeframes by comparing the utilization rate in different time periods. In some embodiments, the average utilization rate for the store and/or specific timeframes (hour, day, month, etc.) may be stored as the baseline model. When the system determines that a utilization rate that deviates from the baseline model for an amount exceeding a threshold (e.g. too high or too low), the system may generate an action recommendation for an investigation into the cause of the significant deviation. In some embodiments, the system may compare the utilization rate with local factors such as road construction, weather, events, holidays, store promotions, etc. to provide a suggested cause for the deviation. In some embodiments, the system may modify the baseline model and/or action recommendation triggering threshold based on known road constructions, weather events, special events, holidays, store promotions, etc.

In some embodiments, the system may further determine a ratio between utilization rate and store sales and/or customer volume for each store and/or timeframe. For example, a ratio of sales volume per car parked in the customer parking area of the parking lot may be determined for a number of stores. The system may recommend an investigation of stores with relatively low sales volume per parked car ratio to determine whether more workers are needed to help with faster checkout and/or more parking enforcement is needed to reduce unauthorized vehicles. Stores with relatively high sales volume per parked car ratio may also be studied to determine whether any practices of the store lead to the increased efficiency. Any such practice may then be suggested for implementation in other stores to increase efficiency. In some embodiments, the turnover rates of cars may be tracked with each car's visual characteristics (e.g. size, shape, color, visible marking, etc.) as seen in the satellite images. The average turnover rate of the cars may be compared to assess the relative efficiency of the stores (e.g. how fast the customers are able to complete their shopping trip). The sales volume per car parked ratio and/or car turnover rate data may further be combined with other store information such as staffing information (e.g. number of works assigned to each task) to determine whether adjustments are needed for at least some time frames. In some embodiments, the system may recommend staffing adjustments and/or management directive changes to less efficient stores.

In some embodiments, the system may track vehicle turnover rate for parking enforcement purposes. For example, the system may track a duration each car is parked in the same spot via satellite image and determine whether the duration exceeds the permitted duration for the parking lot. An action recommendation may be generated when a parking violation is detected (e.g. parked over 8 hours, etc.) The action recommendation may comprise contacting a towing service for removal of the vehicle. In some embodiments, the system may count the number of cars with parking violation and only contact the towing service when that number exceeds a threshold (e.g. over 4 cars).

In some embodiments, the system may identify "premium" spots with satellite image analysis. Premium spots may be spots that have a relatively high utilization rate as compared to other spots in the lot. The identified premium spots may be recommended for use for incentive programs such as special parking for internet order pick-ups, for expecting mothers, for clean air vehicles, etc. In some embodiments, the action recommendation generated by the system may include instructions for store associates to not park in the premium spots and/or use the premium spots for outdoor features (e.g. temporary displays, tents).

In some embodiments, the system may determine one or more obstructions in the parking lot from satellite image analysis. The obstructions may be identified via visual characters of the obstruction and/or via detecting unusual utilization or flow rate of the spots and/or the area. In some embodiments, the system may identify parking spots and/or roadways occupied by unreturned shopping cart(s), snow, large trash, etc. and recommend removal of the obstruction to store clerks. The baseline model may comprise an unobstructed appearance of a parking spot, an expected normal utilization rate for one or more parking spots, and/or an expected normal flow rate for roadways. In some embodiments, the system may identify a section of the parking lot with a high number and/or high frequency of unreturned carts, and recommend the addition and/or relocation of cart corrals. In some embodiments, the system may priority obstruction clearing recommendation for identified premium spots.

In some embodiments, the system may determine the flow rate of roadways and pathways of the parking lot by counting how many vehicles and/or pedestrians pass through a section during a set time period (e.g. cars per minute). The flow rate may be used to identify one or more of: a damaged pavement condition, a narrow aisle condition, a congestion prone section, an accident prone section, and a heavy pedestrian traffic section in the parking lot. In some embodiments, the system may also determine congestion conditions by the flow rate and/or by tracking individual cars' travel through roadways. The system may further record any collisions involving vehicles and/or pedestrians. The baseline condition model may include an expected flow rate for the roadways. A detected flow rate that is significantly below the expected flow rate may trigger an action recommendation. For sections with frequent congestion and/or collision conditions, the system may recommend rerouting car or foot traffic in the area, reassigning at least some parking spots, adjusting the signage, etc. to reduce congestion and collision. In some embodiments, if the system detects frequent congestion near exits of the parking lot, the system may recommend adjusting the number and/or location of exit points, and/or contacting local government to request adjustments to the public roadway. In some embodiments, the system may determine that the cars tend avoid an area of the parking lot and/or roadway through the flow rate information. The system may then recommend an investigation of pavement damage for the avoided section.

In some embodiments, the system may track the flow rate of truck and trailer traffic in the parking area. In some embodiments, the system may determine the unloading speed of each truck by measuring how long a truck is parked at the unloading bay and/or how long the trucked is parked in a waiting area waiting to unload. If the duration that a truck and trailer remains in a waiting spot and/or unloading bay exceeds a threshold specified in the baseline model, the system may recommend an adjustment of unloading dock worker assignments.

In some embodiments, the system may determine one or more vehicle types. For example, the system may determine whether a vehicle is a sedan, RV, SUV, pickup truck, truck and trailer, etc. based on image analysis. In some embodiments, utilization conditions for each type of vehicle may be determined separately. In some embodiments, the system may recommend adjusting the number of parking spaces allotted for each vehicle type based on the utilization conditions for each vehicle type. In some embodiments, the vehicles types may be used by the system to derive demographic information for each store and generate targeted promotions and/or advertisements for that store. The vehicle type compositions may also be determined for different time periods to derive the shopping habits of different demographic groups for targeted promotions. In some embodiments, the identified vehicle types may be used for parking rules enforcement. For example, the system may identify whether large vehicles such as RVs and truck and trailers are parked in designated spots. If violations are detected, the system may recommend contacting a towing service for removal.

In some embodiments, after step 204, the action recommendations may be stored for further analysis. For example, utilization conditions before and after a recommended action is carried out may be compared to assess the effectiveness of the recommended action. Baseline models and/or algorithms for determining the action recommendation may be modified based on the determined effectiveness. For example, the reporting thresholds in the baseline models may be adjusted so that conditions could benefit from corrective actions may not be under-reported or over-reported. In some embodiments, different types of corrective actions may be compared to each other for effectiveness, and the more effective actions may be prioritized in future recommendations.

Figure 3:
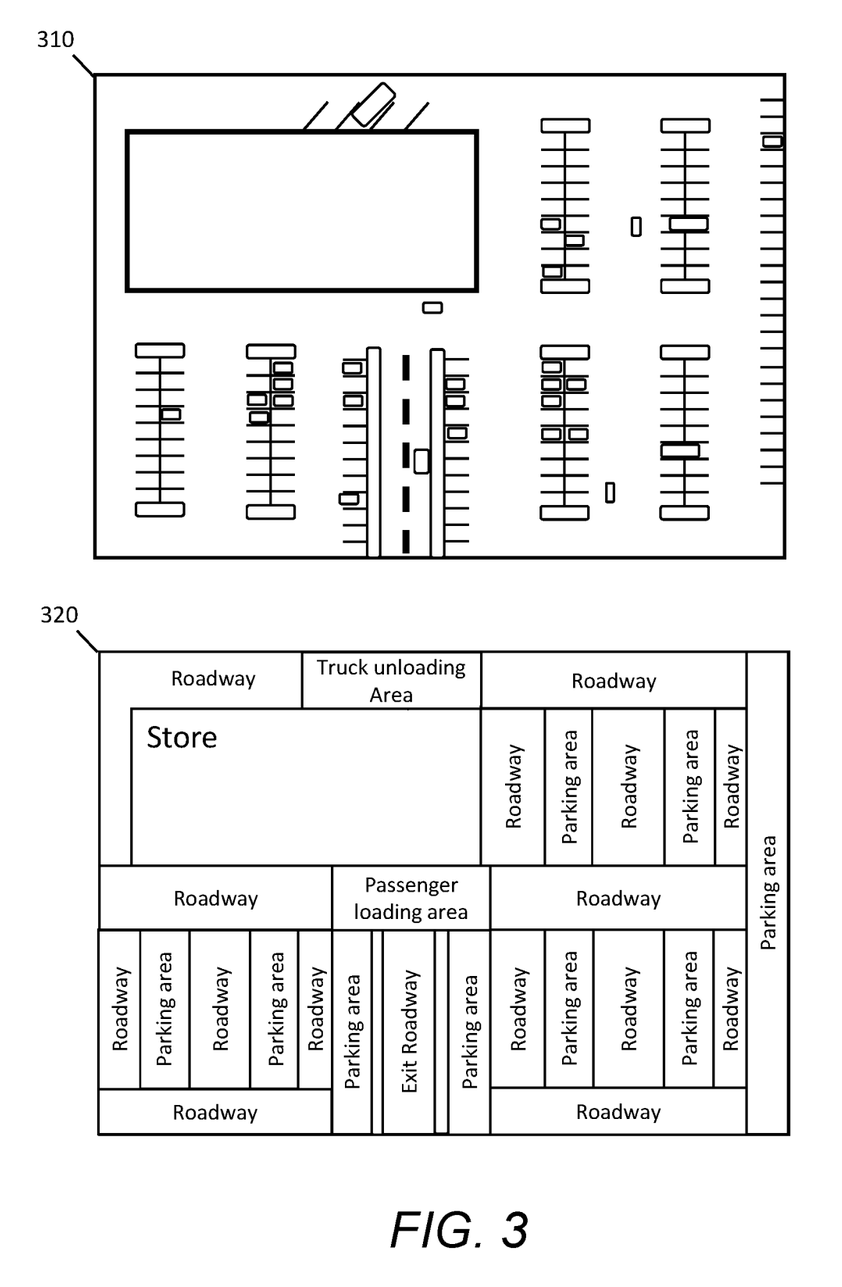
FIG. 3 is an illustration of a parking lot image and section analysis in accordance with several embodiments.

Referring now to FIG. 3, an illustration of a parking lot image and section analysis in accordance with several embodiments is shown. Satellite image 310 represents an image of a monitored parking lot. The image 310 may be cropped from a larger image and/or may be stitched together form two or more satellite images. The section analysis map 320 may be stored in the baseline model database and/or be derived from image analysis of the satellite image 310. One or more baseline utilization condition types and values may be associated with each of the sections shown in the section analysis map 320. For example, a baseline model may include a baseline occupancy rate and/or turnover rate for all of the parking areas, a subset of the parking areas, each of the parking areas, and/or each individual parking spots in the parking areas shown in the section analysis map 320. The baseline model may also include expected vehicles types in a subset of the parking areas, each of the parking areas, and/or each individual parking spots. The baseline model may also include a baseline vehicle and/or pedestrian flow rate for the entire parking lot, a subset of the roadways, and/or separate roadway sections. In some embodiments, the baseline model may further specify the expected turnover rate for truck and trailers in the truck unloading area. The baseline utilization condition values may also be specified for different timeframes (hours of the day, day of the week, day of the month, month of the year, etc.)

Generally, the section analysis map 320 may specify the utilization conditions (e.g. utilization rate, turnover rate, vehicle type, etc.) to be determined from the satellite image 310. The system then sections the satellite images based on the baseline model and determines the specified utilization conditions by performing image analysis of multiple satellite images of the parking area. The determined utilization conditions are compared with the values of the corresponding section in the baseline model. If the actual utilization condition deviates substantially (e.g. exceeding a value or percentage threshold) from the baseline model for any of the sections, the system may determine an action recommendation for that section and/or for the entire parking lot.

The satellite image 310 and the section analysis map 320 are provided as examples only. A monitored parking lot may be of any shape and include any number of parking spots. The system may also monitor multiple physically separated parking areas. The section analysis map 320 may include more or fewer sections. One or more section may also be combined or subdivided in the baseline model and for image analysis. In some embodiments, each individual parking spot may comprise a monitored section. The section analysis map 320 may further distinguish specialized parking spots such as cart corrals, handicap spots, RV parking spots, clean air vehicles spots, online order pick-up spots, etc. for separate analysis.

With the methods, systems, and apparatuses described herein, satellite images may be used to better understand and manage parking lot usage. The system may be used to monitor parking areas, combine parking lot data with other store information, and provide action recommendation for improvements of parking lot design and store operation.

In one embodiment, a system for monitoring a parking area comprises a satellite image database storing a plurality of satellite images of a parking lot taken by one or more satellites over time, a baseline database storing baseline models of a plurality of sections of the parking lot, and a control circuit coupled to the satellite image database and the baseline database. The control circuit being configured to: determine a utilization condition for each of the plurality of sections of the parking lot based on performing image analysis on the plurality of satellite images of the parking lot, compare the utilization condition for each of the plurality of sections of the parking lot with the baseline model of the plurality of sections of the parking lot, and in an event that the utilization condition of a section of the plurality of sections of the parking lot substantially deviates from the baseline model of the section, automatically generate an action recommendation for the section of the parking lot.

In one embodiment, a method for monitoring a parking area comprises: compiling a plurality of satellite images of a parking lot stored in a satellite image database, the plurality of satellite images of the parking lot being taken by one or more satellites over time, determining a utilization condition for a plurality of sections of the parking lot based on performing image analysis on the plurality of satellite images of the parking lot, comparing the utilization condition for each of the plurality of sections of the parking lot with a baseline model of each of the plurality of sections of the parking lot stored in a baseline database, and in an event that the utilization condition of a section of the plurality of sections of the parking lot substantially deviates from the baseline model of the section, automatically generating an action recommendation for the section of the parking lot.

In one embodiment, an apparatus for monitoring a parking area comprises: a non-transitory storage medium storing a set of computer readable instructions, a control circuit configured to execute the set of computer readable instructions which causes the control circuit to: compile a plurality of satellite images of a parking lot stored in a satellite image database, the plurality of satellite images of the parking lot being taken by one or more satellites over time, determine a utilization condition for each of a plurality of sections of the parking lot based on performing image analysis on the plurality of satellite images of the parking lot, compare the utilization condition for the plurality of sections of the parking lot with a baseline model of each of the plurality of sections of the parking lot stored in a baseline database, and in an event that the utilization condition of a section of the plurality of sections of the parking lot substantially deviates from the baseline model of the section, automatically generate an action recommendation for the section of the parking lot.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A system for monitoring a parking area comprising:
a satellite image database storing a plurality of satellite images of a parking lot taken by one or more satellites over time;
a baseline database storing baseline models of a plurality of sections of the parking lot; and
a control circuit coupled to the satellite image database and the baseline database, the control circuit being configured to:
determine a utilization condition for each of the plurality of sections of the parking lot based on performing image analysis on the plurality of satellite images of the parking lot;

compare the utilization condition for each of the plurality of sections of the parking lot with a baseline model of the plurality of sections of the parking lot; and in an event that the utilization condition of a section of the plurality of sections of the parking lot exceeds a deviation threshold of the baseline model of the section, automatically generate an action recommendation for the section of the parking lot;

wherein the section corresponds to a loading zone of a shopping facility and the utilization condition corresponding to a turnover rate for one or more trucks.

2. The system of claim 1, wherein the section corresponds to a customer parking area and the utilization condition corresponds to one or more of a parking lot utilization rate and customer volume over time.

3. The system of claim 2, wherein in the event that the parking lot utilization rate of the customer parking area is below the deviation threshold of a utilization rate in the baseline model for a timeframe, the action recommendation comprises generating a promotion associated with the timeframe.

4. The system of claim 2, wherein in the event that the parking lot utilization rate of the customer parking area is above the deviation threshold of a utilization rate in the baseline model, the action recommendation comprises increasing a number of available parking spaces.

5. The system of claim 1, wherein the action recommendation comprises an adjustment of unloading dock worker assignments based on the turnover rate for the one or more trucks.

6. The system of claim 1, wherein the section corresponds to a parking space, and the utilization condition corresponds to a duration a vehicle is parked in the parking space.

7. The system of claim 6, wherein in the event that the duration the vehicle is parked in the parking space exceeds a permitted duration, the action recommendation comprises contacting a towing service for removal of the vehicle.

8. The system of claim 1, wherein the control circuit is further configured to identify a vehicle type for one or more vehicles in the plurality of satellite images of the parking lot, and wherein utilization conditions are determined for each vehicle type.

9. The system of claim 8, wherein the action recommendation comprises adjusting a number of parking spaces allotted for each vehicle type based on the utilization conditions for each vehicle type.

10. The system of claim 1, wherein the control circuit is further configured to identify one or more of a damaged pavement condition, a narrow aisle condition, a congestion prone section, an accident prone section, and a heavy pedestrian traffic section in the parking lot based on the utilization condition.

11. A method for monitoring a parking area comprising:
compiling a plurality of satellite images of a parking lot stored in a satellite image database, the plurality of satellite images of the parking lot being taken by one or more satellites over time;
determining a utilization condition for a plurality of sections of the parking lot based on performing image analysis on the plurality of satellite images of the parking lot;
comparing the utilization condition for each of the plurality of sections of the parking lot with a baseline model of each of the plurality of sections of the parking lot stored in a baseline database; and
in an event that the utilization condition of a section of the plurality of sections of the parking lot exceeds a deviation threshold of the baseline model of the section, automatically generating an action recommendation for the section of the parking lot;
wherein the section corresponds to a loading zone of a shopping facility and the utilization condition corresponding to a turnover rate for one or more trucks.

12. The method of claim 11, wherein the section corresponds to a customer parking area and the utilization condition corresponds to one or more of a parking lot utilization rate and customer volume over time.

13. The method of claim 12, wherein in the event that the parking lot utilization rate of the customer parking area is below the deviation threshold of a utilization rate in the baseline model for a timeframe, the action recommendation comprises generating a promotion associated with the timeframe.

14. The method of claim 12, wherein in the event that the parking lot utilization rate of the customer parking area is above the deviation threshold of a utilization rate in the baseline model, the action recommendation comprises increasing a number of available parking spaces.

15. The method of claim 11, wherein the action recommendation comprises an adjustment of unloading dock worker assignments based on the turnover rate for the one or more trucks.

16. The method of claim 11, wherein the section corresponds to a parking space, and the utilization condition corresponds to a duration a vehicle is parked in the parking space.

17. The method of claim 16, wherein in the event that the duration the vehicle is parked in the parking space exceeds a permitted duration, the action recommendation comprises contacting a towing service for removal of the vehicle.

18. The method of claim 11, further comprising:
identifying a vehicle type for one or more vehicles in the plurality of satellite images of the parking lot, and wherein utilization conditions are determined for each vehicle type.

19. The method of claim 18, wherein the action recommendation comprises adjusting a number of parking spaces allotted for each vehicle type based on the utilization conditions for each vehicle type.

20. The method of claim 11, further comprising:
identifying one or more of a damaged pavement condition, a narrow aisle condition, a congestion prone section, an accident prone section, and a heavy pedestrian traffic section in the parking lot based on the utilization condition.

21. An apparatus for monitoring a parking area comprising:
a non-transitory storage medium storing a set of computer readable instructions;
a control circuit configured to execute the set of computer readable instructions which causes to the control circuit to:
compile a plurality of satellite images of a parking lot stored in a satellite image database, the plurality of satellite images of the parking lot being taken by one or more satellites over time;
determine a utilization condition for each of a plurality of sections of the parking lot based on performing image analysis on the plurality of satellite images of the parking lot;
compare the utilization condition for the plurality of sections of the parking lot with a baseline model of each of the plurality of sections of the parking lot stored in a baseline database; and in an event that the utilization condition of a section of the plurality of sections of the parking lot exceeds a deviation threshold of the baseline model of the section, automatically generate an action recommendation for the section of the parking lot;

wherein the section corresponds to a loading zone of a shopping facility and the utilization condition corresponding to a turnover rate for one or more trucks.

22. A system for monitoring a parking area comprising:
a satellite image database storing a plurality of satellite images of a parking lot taken by one or more satellites over time;
a baseline database storing baseline models of a plurality of sections of the parking lot; and
a control circuit coupled to the satellite image database and the baseline database, the control circuit being configured to:
 determine a utilization condition for each of the plurality of sections of the parking lot based on performing image analysis on the plurality of satellite images of the parking lot;
 compare the utilization condition for each of the plurality of sections of the parking lot with a baseline model of the plurality of sections of the parking lot; and
 in an event that the utilization condition of a section of the plurality of sections of the parking lot exceeds a deviation threshold of the baseline model of the section, automatically generate an action recommendation for the section of the parking lot;
wherein the control circuit is further configured to identify a vehicle type for one or more vehicles in the plurality of satellite images of the parking lot, and wherein utilization conditions are determined for each vehicle type; and
wherein the action recommendation comprises adjusting a number of parking spaces allotted for each vehicle type based on the utilization conditions for each vehicle type.

23. A method for monitoring a parking area comprising:
compiling a plurality of satellite images of a parking lot stored in a satellite image database, the plurality of satellite images of the parking lot being taken by one or more satellites over time;
determining a utilization condition for a plurality of sections of the parking lot based on performing image analysis on the plurality of satellite images of the parking lot;
comparing the utilization condition for each of the plurality of sections of the parking lot with a baseline model of each of the plurality of sections of the parking lot stored in a baseline database;
in an event that the utilization condition of a section of the plurality of sections of the parking lot exceeds a deviation threshold of the baseline model of the section, automatically generating an action recommendation for the section of the parking lot; and
identifying a vehicle type for one or more vehicles in the plurality of satellite images of the parking lot, and wherein utilization conditions are determined for each vehicle type;
wherein the action recommendation comprises adjusting a number of parking spaces allotted for each vehicle type based on the utilization conditions for each vehicle type.

* * * * *